(12) United States Patent
Jacobsen

(10) Patent No.: US 6,479,027 B1
(45) Date of Patent: Nov. 12, 2002

(54) PROCESS FOR THE PREPARATION OF AMMONIA AND AMMONIA SYNTHESIS GAS

(75) Inventor: Claus J. H. Jacobsen, Jægerspris (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/692,037

(22) Filed: Oct. 20, 2000

Related U.S. Application Data

(60) Provisional application No. 60/162,151, filed on Oct. 29, 1999.

(51) Int. Cl.$^7$ .............................. C01C 1/04; B01J 27/24
(52) U.S. Cl. ..................... 423/362; 423/363; 502/200
(58) Field of Search ............................. 423/359, 360, 423/361, 362, 363; 502/200

(56) References Cited

U.S. PATENT DOCUMENTS

| | | | |
|---|---|---|---|
| 4,130,506 A | * 12/1978 | Collier et al. | ................ 502/200 |
| 4,600,571 A | 7/1986 | McCarroll et al. | ........... 423/363 |
| 4,689,208 A | * 8/1987 | Pinto | ........................ 423/362 |

FOREIGN PATENT DOCUMENTS

| | | |
|---|---|---|
| GB | 2033776 | 5/1980 |
| JP | 9168739 | 6/1997 |

OTHER PUBLICATIONS

Chemical Abstracts 104 : 156652. (No date).*

* cited by examiner

*Primary Examiner*—Wayne A. Langel
(74) *Attorney, Agent, or Firm*—Dickstein Shapiro Morin & Oshinsky LLP

(57) ABSTRACT

Process for the preparation of ammonia from ammonia synthesis gas by contacting the synthesis gas with ammonia forming conditions with a catalyst comprising ruthenium as the active catalytic material supported on a carrier of boron nitride and/or silicon nitride.

6 Claims, No Drawings

PROCESS FOR THE PREPARATION OF AMMONIA AND AMMONIA SYNTHESIS GAS

This application claims the benefit of U.S. Provisional Application No. 60/162,151, filed Oct. 29, 1999.

BACKGROUND OF THE INVENTION

1. Field of the Invention

The present invention relates to synthesis of ammonia by contacting ammonia synthesis gas with an ammonia catalyst with ruthenium as the active catalytic material supported on a metal nitride carrier.

2. Description of the Related Art

Ruthenium based catalysts for use in the synthesis of ammonia from ammonia synthesis gas are known in the art (U.S. Pat. No. 4,600,571, JP Patent Publication No. 9168739 and GB Patent No. 2,033,766).

In order to minimise the necessary amount of expensive ruthenium such catalysts are usually supported on a carrier material to maximise the accessible surface area of the active ruthenium particles.

Several supports have been proposed as suitable in catalytic ammonia synthesis, those are MgO, $Al_2O_3$ and $MgAl_2O_4$. At present the most active ruthenium catalysts are those being supported on graphitised carbon as carrier material.

However, a severe drawback in using carbon-based support is susceptibility to hydrogenation under industrial conditions. The carbon support transforms slowly into methane resulting in a gradual loss of the support and eventually into operating difficulties.

DETAILED DESCRIPTION OF THE PREFERRED EMBODIMENTS

The general object of this invention is to provide ruthenium based ammonia synthesis catalysts with an improved carrier of boron nitride and/or silicon nitride as support material. Nitrides are isoelectronic with carbon. Boron nitride and silicon nitride exist like carbon as several allotropes. One of these allotropes is a graphitic form usually called white graphite. Contrary to carbons, boron nitride and silicon nitride are thermodynamically stable under industrial ammonia synthesis conditions.

Both BN and $Si_3N_4$ can be obtained as high surface area materials (>25 $m^2/g$) and shaped into suitable carriers by methods known in the art.

Promoted ruthenium catalysts supported on BN or $Si_3N_4$ are completely stable during catalytic ammonia synthesis.

Accordingly, this invention makes use of boron nitride and/or silica nitride as catalyst carrier for ammonia catalyst with ruthenium as the active catalytic material in the ammonia synthesis.

BN or $Si_3N_4$ can either be obtained from commercial manufactures or prepared according to methods known in the art. The surface area of the nitride support is preferably above 25 $m^2/g$. Alternatively, the nitride support is obtained from Si and B precursor that will transform into the nitride during treatment with ammonia.

Ruthenium is introduced onto the support by conventional methods, e.g. by impregnation with an appropriate ruthenium containing compound such as the chloride or the acetate.

Prior to promotion the catalyst can be reduced by treatment with a reducing gas such as hydrogen or synthesis gas.

Promotion can be conducted by impregnation with salts of the promoters. The promoters are chosen from the known ammonia synthesis catalyst promoters, i.e. alkali or alkaline earth metals or from the rare earth metals.

The promoters can be introduced sequentially or together.

EXAMPLES

Example 1

Preparation of Catalysts.

A boron nitride support (hexagonal, surface area 85 $m^2/g$, crystal size determined by X-ray powder diffraction 7.5 nm) is impregnated with ruthenium nitroso nitrate to obtain a Ru concentration of 5 wt %. The impregnated sample is dried at 80° C. and reduced in a flow of dihydrogen at 450° C. This sample is marked 5RuBN.

Another sample is prepared similarly but contains 7 wt % Ru. This sample is marked 7RuBN. The catalyst density is approximately 1.5 g/ml.

Example 2

Cesium Promotion of Catalysts.

5RuBN and 7RuBN are impregnated with aqueous solutions of Cs-nitrate to obtain a concentration of Cs of 3 wt %. The samples are marked 3Cs5RuBN and 3Cs7RuBN, respectively.

Example 3

Barium Promotion of Catalysts.

5RuBN and 7RuBN are impregnated with aqueous solutions of Ba-nitrate to obtain a concentration of Ba of 3 wt %. The samples are marked 3Ba5RuBN and 3Ba7RuBN, respectively.

Example 4

Testing of Catalysts.

The catalysts are tested in an isothermal plug flow reactor operating at 100 bar and 400° C. The inlet gas contains 4.5% ammonia in a 3:1 mixture of dihydrogen/dinitrogen. The flow is adjusted to obtain 12% ammonia in the exit. Under these conditions the catalysts produces ammonia at different rates expressed as ml ammonia produced per gram of catalyst per hour:

| Catalyst | ml $NH_3/(g \cdot h)$ |
| --- | --- |
| 5RuBN | 140 |
| 7RuBN | 190 |
| 3Cs5RuBN | 1150 |
| 3Cs7RuBN | 1320 |
| 3Ba5RuBN | 4600 |
| 3Ba7RuBN | 4930 |

Example 5

Thermostability of Catalysts.

To determine the stability of the catalysts, 3Ba5RuBN and 3Ba7RuBN are heated in the reactor to 550° C. for 1000 h. Under these conditions the exit concentration of ammonia is around 7.0%. After this treatment, the catalyst is tested again:

| Catalyst | ml $NH_3/(g \cdot h)$ |
| --- | --- |
| 3Ba5RuBN | 4580 |
| 3Ba7RuBN | 4960 |

Example 6
Passivation and Reactivation of Catalyst.

To determine whether the catalyst can be reactivated after passivation, the catalyst of Sample 5 (3Ba5RuBN) was treated at room-temperature with 1000 ppm $O_2$ in $N_2$ for 10 hours and then exposed to the ambient atmosphere. Then it was loaded into the reactor again and tested under identical conditions:

| Catalyst | ml $NH_3$/(g · h) |
|---|---|
| 3Ba5RuBN | 4610 |

What is claimed is:

1. A process for the preparation of ammonia from ammonia synthesis gas comprising contacting the synthesis gas under ammonia forming conditions with a catalyst comprising ruthenium as the active catalytic material supported on a carrier of boron nitride and/or silicon nitride, wherein the carrier is formed to have a surface area of greater than 25 $m^2$/g.

2. The process of claim 1, wherein the ruthenium is impregnated onto the carrier.

3. The process of claim 1, wherein the carrier is selected from the group consisting of boron nitride and silicon nitride.

4. The process of claim 1, wherein the catalyst has been promoted by being impregnated with a metallic salt of a metal selected from the group consisting of alkali metals, alkaline earth metals, and rare earth metals.

5. The process of claim 4, wherein the catalyst is promoted with Cesium.

6. The process of claim 4, wherein the catalyst is promoted with Barium.

* * * * *